(12) United States Patent
Park et al.

(10) Patent No.: US 6,982,778 B2
(45) Date of Patent: Jan. 3, 2006

(54) LIQUID CRYSTAL DISPLAY DEVICE HAVING A COLOR FILTER AND MANUFACTURING METHOD FOR THE SAME

(75) Inventors: Su-Hyun Park, Anyang-si (KR); Sunghoe Yoon, Anyang-si (KR)

(73) Assignee: LG.Philips LCD Co., Ltd., Seoul (KR)

( * ) Notice: Subject to any disclaimer, the term of this patent is extended or adjusted under 35 U.S.C. 154(b) by 108 days.

(21) Appl. No.: 10/668,088

(22) Filed: Sep. 23, 2003

(65) Prior Publication Data

US 2004/0125321 A1 Jul. 1, 2004

(30) Foreign Application Priority Data

Dec. 30, 2002 (KR) .................. 10-2002-0086617

(51) Int. Cl.
*G02F 1/1339* (2006.01)
(52) U.S. Cl. ................... 349/153; 349/106; 349/115
(58) Field of Classification Search ............... 349/106, 349/115, 113, 175, 185, 153
See application file for complete search history.

(56) References Cited

U.S. PATENT DOCUMENTS 6,809,786 B2 * 10/2004 Lee ........................... 349/115
6,833,891 B2 * 12/2004 Jiang et al. ................. 349/115

OTHER PUBLICATIONS

Bahadur, Liquid Crystals 1990, World Scientific, vol. 1, pp. 181-185.*

* cited by examiner

*Primary Examiner*—Tarifur R. Chowdhury
*Assistant Examiner*—David Chung
(74) *Attorney, Agent, or Firm*—McKenna Long & Aldridge LLP

(57) ABSTRACT

A liquid crystal display (LCD) device comprises a first substrate having a cholesteric liquid crystal (CLC) color filter, a second substrate having a thin film transistor, a seal pattern formed on one of the first and second substrates, a first electrode on the cholesteric liquid crystal (CLC) color filter, the first electrode being overlapped with a portion of the seal pattern, a second electrode on the second substrate, and a liquid crystal layer between the first and second electrodes.

21 Claims, 7 Drawing Sheets

LIQUID CRYSTAL DISPLAY DEVICE HAVING A COLOR FILTER AND MANUFACTURING METHOD FOR THE SAME

This application claims the benefit of Korean Patent Application No. 2002-86617, filed on Dec. 30, 2002 in Korea, which is hereby incorporated by reference for all purposes as if fully set forth herein.

BACKGROUND OF THE INVENTION

1. Field of the Invention

The present invention relates to a liquid crystal display (LCD) device and more particularly, to a liquid crystal display (LCD) device having a cholesteric liquid crystal (CLC) color filter and a method for manufacturing the same.

2. Discussion of the Related Art

As the society has been progressing to an age of information, a flat panel display device having a superior qualities such as a small thickness, a low weigh and a low power consumption has been requested. Accordingly, liquid crystal display devices have been most actively applied to many modem conveniences such as notebook computers and desk top computers because of their superior resolution, improved color images display and high quality displayed images.

Generally, the liquid crystal display (LCD) device has upper and lower substrates and a liquid crystal layer between the upper and lower substrates. Each substrate has an electrode for forming an electric field between upper and lower substrates. The liquid crystal display (LCD) device display images by controlling a light transmissivity depending on an alignment of liquid crystal molecules. The light transmissivity can be controlled by aligning the liquid crystal molecules by forming an electric field between the electrodes of the upper and lower substrates. A structure of a typical liquid crystal display (LCD) device will be described more in detail hereinafter with reference to FIG. 1.

FIG. 1 illustrates a cross-sectional view of a typical liquid crystal display (LCD) device.

Referring to FIG. 1, the liquid crystal display (LCD) device usually has first and second substrates 10 and 20. The first substrate 10 has a thin film transistor "T1" that has a gate electrode 11, a source electrode 15a, a drain electrode 15b, an active layer 13 and an ohmic contact layer 14. A gate insulating layer 12 is formed over the gate electrode 11 and the first substrate 10. A passivation layer 16 is formed over the thin film transistor "T1" and has a drain contact hole 16c exposing a portion of the drain electrode 15b. A pixel electrode 17 is formed on the passivation layer 16 and connected to the drain electrode 15b via the drain contact hole 16c. A black matrix 21 is formed beneath the second substrate 20 corresponding to the thin film transistor "T1" and color filters 22a and 22b are formed thereunder. A common electrode 23 is formed beneath the color filters 22a and 22b with transparent conductive metal material. Each of the color filters 22a and 22b corresponds to each of the pixel electrodes 17. A liquid crystal layer 30 is disposed between the common and pixel electrodes 23 and 17. An alignment of liquid crystal molecules of the liquid crystal layer 30 is changed by an electric field that is formed between the common and pixel electrode 23 and 17 by applying voltage to the common and pixel electrodes 23 and 17. Though not shown in FIG. 1, an alignment layer is further formed on the pixel electrode 17 and beneath the common electrode 23 to initially align the liquid crystal molecules. First and second polarizers 41 and 42 are formed respectively beneath the first substrate 10 and on the second substrate 20. The polarizers 41 and 42 converts a natural light into a linearly polarized light by transmitting only a natural light component parallel with a light transmission axis. The light transmission axis of the first polarizer 41 forms an angle of 90° (degree) with the light transmission axis of the second polarizer 42. By the way, because the aforementioned liquid crystal display (LCD) device cannot emit light for itself, an additional light source is requested. The liquid crystal display device can be divided into two different types depending on a position of the light source. One is a transmissive liquid crystal display (LCD) device, and the other is a reflective liquid crystal display (LCD) device.

The transmissive liquid crystal display (LCD) device has the light source behind a liquid crystal panel (e.g., under the first polarizer 41 of the first substrate 10 in FIG. 1) and displays images by irradiating incident light from the light source to the liquid crystal. Accordingly, the common and pixel electrodes 23 and 17 must be formed of transparent conductive material and the first and second substrates 10 and 20 must also be formed of transparent material.

Meanwhile, the reflective liquid crystal display (LCD) device controls the transmissivity according to the alignment of the liquid crystal molecules by reflecting the ambient light or the artificial light from an exterior of reflective liquid crystal display (LCD) device. In the reflective liquid crystal display (LCD) device, the pixel electrode 17 is formed of conductive material that has a superior reflective properties, and the common electrode 23 is formed of transparent conductive material to transmit the ambient light. The reflective liquid crystal display (LCD) device does not need the first polarizer 41 and the first substrate 10 may be formed of material having a low transmissivity or opaque material.

Because the transmissive liquid crystal display (LCD) device utilizes an artificial light source such as a backlight, it can display images even in dark environments. Because the reflective liquid crystal display (LCD) device utilizes an ambient light as the light source, it has a low power consumption. The usual color filter for the aforementioned liquid crystal display (LCD) device is an absorption type color filter, and thus a lot of light loss occurs as the light transmits through the color filter, resulting in a decrease of a luminance of the liquid crystal display (LCD) device. Accordingly, the LCD device having a cholesteric liquid crystal (CLC) color filter, which utilizes the property of the CLC, has been researched and developed in the field. If the CLC color filter is used for the transmissive LCD device, the luminance can be improved compared to LCD devices having the absorption type color filter. If the CLC color filter is used for the reflective LCD device, color reproducibility and contrast ratio can be improved compared to LCD deviceS having the absorption type color filter.

The CLC color filter is formed using a selective reflection property of the CLC. The CLC color filter has a function of a mirror when each liquid crystal layer having a helical structure forms a perfect alignment. That is, if all helical axes of the CLC align vertically to the substrate, the CLC color filter reflects the incident light at a surface of the CLC color filter in a mirror reflection in which an incidence angle and a reflection angle are same. The CLC color filter does not reflect all incident light, but reflects the light in a particular wavelength range depending on a helical pitch. Accordingly, red (R), green (G) and blue (B) colors can be displayed by locally controlling the helical pitch of a portion of the CLC color filter.

A rotational direction of the CLC helix is important characteristic in the helical structure of the CLC itself. The rotational direction of the CLC helix is an important factor for the polarization phenomenon. That is, the direction of a circular polarization of the reflected light depends on whether the helix structure of the CLC is right-handed or left-handed. The right-handed CLC reflects light having a right circular polarization that has a wavelength corresponding to the pitch of the right-handed CLC. Because the ambient light is a mixture of light having a right circular polarization and light having a left circular polarization, light having either the right circular polarization or the left circular polarization can be extracted according to the structure of the CLC, i.e., a right handed helix or left-handed helix. Because polarization property, i.e., a linear polarization, is used in the conventional liquid crystal display devices, the degree of light utilization will be greatly improved using the CLC, and will result in an effective reduction of power consumption compared to the color filters including pigment or dye.

FIG. 2 illustrates a cross-sectional view of a transmissive liquid crystal display (LCD) device having a CLC color filter according to the related art.

Because the liquid crystal display (LCD) device having the CLC color filter in FIG. 2 has a same structure as that of FIG. 1, an explanation on same elements will not be described again for the sake of a convenience. Referring to FIG. 2, first and second substrates 50 and 60 are spaced apart from each other and opposing each other. A thin film transistor "T2" and a pixel electrode 57 are formed on the first substrate 50 and a black matrix 61, cholesteric liquid crystal (CLC) color filters 62a, 62b, 62c and 62d and a common electrode 63 are formed on the second substrate 60. The CLC color filter has a double layer structure, each layer of which reflects light in a different wavelength range. Though not shown in FIG. 2, an alignment layer may further be formed between the CLC color filters 62a and 62c and the black matrix 61 to initially align CLC molecules. Because the LCD device of FIG. 2 is a transmissive type LCD device, a backlight (not shown) is disposed over the first substrate 50 and irradiates light to the second substrate 60. Because the CLC reflects light in a particular wavelength range depending on the helical pitch of the CLC, as mentioned before, the light in a wavelength range other than that of a desired color must be reflected on the surface of the CLC color filter. If the red color is to be displayed, one of the double layers of the CLC color filter must reflect one of the green color and the blue color, and then the other layer of the CLC color filter must reflect the remaining color. That is, a first layer of the CLC color filter 62b, for example, reflects a component of the incident light in a wavelength range of the blue color and transmits the remaining components of the incident light. The incident light components that passed through the first layer of the CLC color filter 62b reach the second layer of the CLC color filter 62a, for example. The second layer 62a of the CLC color filter reflects the light in a wavelength range of the green color. Accordingly, only the light in a wavelength range of the red color can be transmitted and thus the red color can be displayed as a result.

FIG. 3 illustrates a cross-sectional view of a reflective liquid crystal display (LCD) device having a CLC color filter according to the related art.

Referring to FIG. 3, description of a thin film transistor "T3" is simplified because the thin film transistor "T3" has a same structure as that of FIG. 1 and FIG. 2. A light absorption layer 72 is formed on a first substrate 71, and then cholesteric liquid crystal (CLC) color filters 73a, 73b and 73c are formed on the light absorption layer 72. The CLC color filters 73a, 73b and 73c respectively display the red (R), the green (G) and the blue (B) colors by reflecting light in a wavelength range of the red, the green or the blue color corresponding to each portion of the CLC color filters 73a, 73b and 73c. A common electrode 74 is formed of transparent conductive material on the CLC color filters 73a, 73b and 73c. Because the CLC color filters 73a, 73b and 73c serve as a reflector as well as a color filter, an additional reflector is not required. A second substrate 75 opposing the first substrate 71 is spaced apart from the first substrate 71. The thin film transistor "T3" and a transparent pixel electrode 76 are formed beneath the second substrate 75. A liquid crystal layer 77 is disposed between the first and second substrates 71 and 75. A polarizer 78 is further formed on the second substrate 75. Though not shown in FIG. 3, an alignment layer is further formed respectively on the absorption layer 72 and the common electrode 74 and beneath the pixel electrode 76. In addition, a retardation layer (not shown), called a quarter wave plate, having a phase difference of $\lambda/4$, may further be formed between the polarizer 78 and the second substrate 75.

FIG. 4 illustrates a laminated structure near a seal pattern area of a reflective liquid crystal display (LCD) device having a CLC color filter according to a first example of the related art.

Referring to FIG. 4, an inorganic insulating layer 92, a organic insulating layer 94 and a chromium (Cr) layer 96 are sequentially formed beneath an upper substrate 90. An absorption layer 82, an alignment layer 84, a CLC color filter 86 and a transparent electrode 88 are sequentially formed on a lower substrate 80. Additional alignment layers 98 and 89 are formed respectively beneath the chromium (Cr) layer 96 and on the transparent electrode 88 to initially align liquid crystal molecules. A liquid crystal layer 85 is disposed between the upper and lower substrates 90 and 80 and the upper and lower substrates 90 and 80 are attached by a seal pattern 99 that is formed on one of the upper and lower substrates 90 and 80. The seal pattern 99 maintains a cell gap between the upper and lower substrates 90 and 80 and prevents the liquid crystal from leaking out. The upper substrate 90 of the liquid crystal display (LCD) device in FIG. 4 further has another transparent electrode (not shown) that forms an electric field with the transparent electrode 88 of the lower substrate 80. Referring to FIG. 4, the transparent electrode 88 is formed on a whole area of the lower substrate 80. Accordingly, the liquid crystal layer 85 between the upper and lower substrates 90 and 80 can be protected from being contaminated by the CLC color filter 86 on the lower substrate 80, as shown in "A" of FIG. 4. However, because the adhesive property between the CLC color filter 86 and the transparent electrode 88 that is formed of indium tin oxide (ITO) is not good, an adhesive strength of the seal pattern 99 becomes weaker than that of a standard structure in FIG. 5. Thus seal pattern may be broken after the upper and lower substrates 90 and 80 are attached. However, the aforementioned problem may be overcome by improving the adhesive property between the CLC color filter 86 and the indium tin oxide (ITO) electrode 88 by improving a physical property of the CLC color filter 86.

FIG. 5 illustrates a laminated structure near a seal pattern area of a reflective liquid crystal display (LCD) device having a CLC color filter according to a second example of the related art.

Referring to FIG. 5, the basic structure of the LCD device according to the second example of the related art is same as in FIG. 4 except the indium tin oxide (ITO) electrode 188 on a lower substrate 180. As shown in FIG. 5, the indium tin oxide (ITO) electrode 186 is not formed on the whole area of the lower substrate 180, but formed spaced apart from a seal pattern 199 as illustrated as "B". This structure of the LCD device is obtained by the standard manufacturing process. Though the adhesive strength of the seal pattern 199 can be improved with this structure, there exists an area where the CLC color filter 186 contacts the liquid crystal layer 185. Accordingly, because the CLC color filter 186 and the liquid crystal of the liquid crystal layer 185 are the same kind of material, contact of the CLC color filter 186 with the liquid crystal of the liquid crystal layer 185 may cause a swelling phenomenon of the liquid crystal and an interaction force. Above all, the cholesteric liquid crystal (CLC) color filter 186 may contaminate the liquid crystal layer 185 because of contaminants such as ions and particles. Accordingly, the contamination of the liquid crystal causes a bad action, such as a stain in the liquid crystal layer, and thus a quality of displayed images may be deteriorated.

SUMMARY OF THE INVENTION

Accordingly, the present invention is directed to a liquid crystal display device having a CLC color filter and a manufacturing method for the same that substantially obviates one or more of problems due to limitations and disadvantages of the related art.

An advantage of the present invention is to provide a liquid crystal display device having a CLC color filter and a transparent electrode on the CLC color filter wherein the transparent electrode is overlapped with a portion of a seal pattern to prevent a liquid crystal layer from contacting the CLC color filter.

Another advantage of the present invention is to provide a manufacturing method for a color filter substrate for a liquid crystal display (LCD) device wherein a transparent electrode is overlapped with a portion of a seal pattern to prevent a liquid crystal layer from contacting the CLC color filter.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a liquid crystal display (LCD) device comprises a first substrate having a CLC color filter, a second substrate having a thin film transistor, a seal pattern formed on one of the first and second substrates, a first electrode on the CLC color filter, the first electrode being overlapped with a portion of the seal pattern, a second electrode on the second substrate, and a liquid crystal layer between the first and second electrodes.

The liquid crystal display device may be a reflective liquid crystal display (LCD) device or a transmissive liquid crystal display (LCD) device.

The cholesteric liquid crystal (CLC) color filter may have a single-layered structure or a double-layered structure.

An overlapped width between the first electrode and the seal pattern is over zero and less than a width of the seal pattern.

The first electrode is formed of transparent conductive material such as indium tin oxide (ITO).

A method of manufacturing a color filter substrate for a liquid crystal display (LCD) device comprises forming a first alignment layer on a substrate, the substrate having a seal pattern forming area defined thereon, forming a cholesteric liquid crystal (CLC) color filter on the first alignment layer, forming an electrode on the cholesteric liquid crystal (CLC) color filter, the electrode being overlapped with a portion of the seal pattern forming area, and forming a second alignment layer on the first electrode.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE ILLUSTRATED EMBODIMENTS

Reference will now be made in detail to embodiments of the present invention, which are illustrated in the accompanying drawings.

Figure 6A:
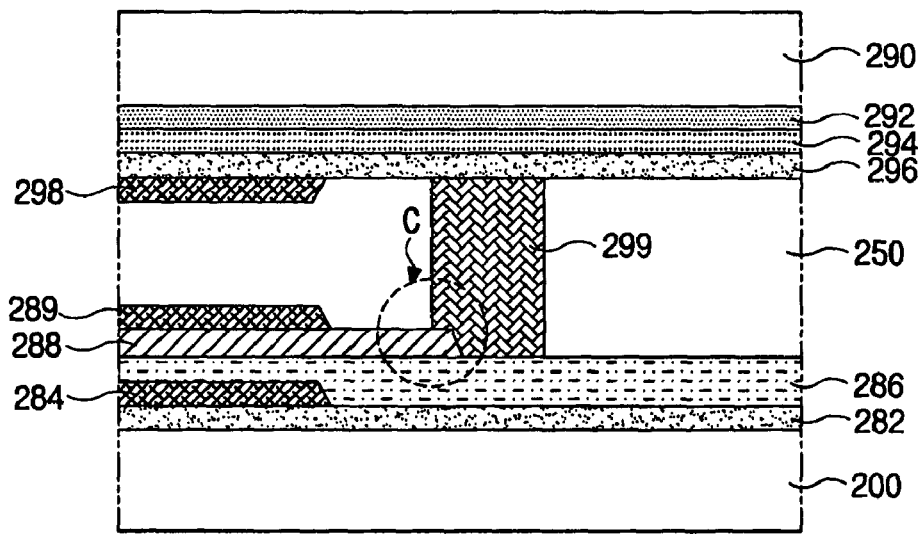
FIG. 6A illustrates a laminated structure near a seal pattern area of a liquid crystal display (LCD) device having a cholesteric liquid crystal (CLC) color filter according to an embodiment of the present invention.

FIG. 6A illustrates a laminated structure near a seal pattern area of a liquid crystal display (LCD) device having a cholesteric liquid crystal (CLC) color filter according to an embodiment of the present invention.

Figure 1:
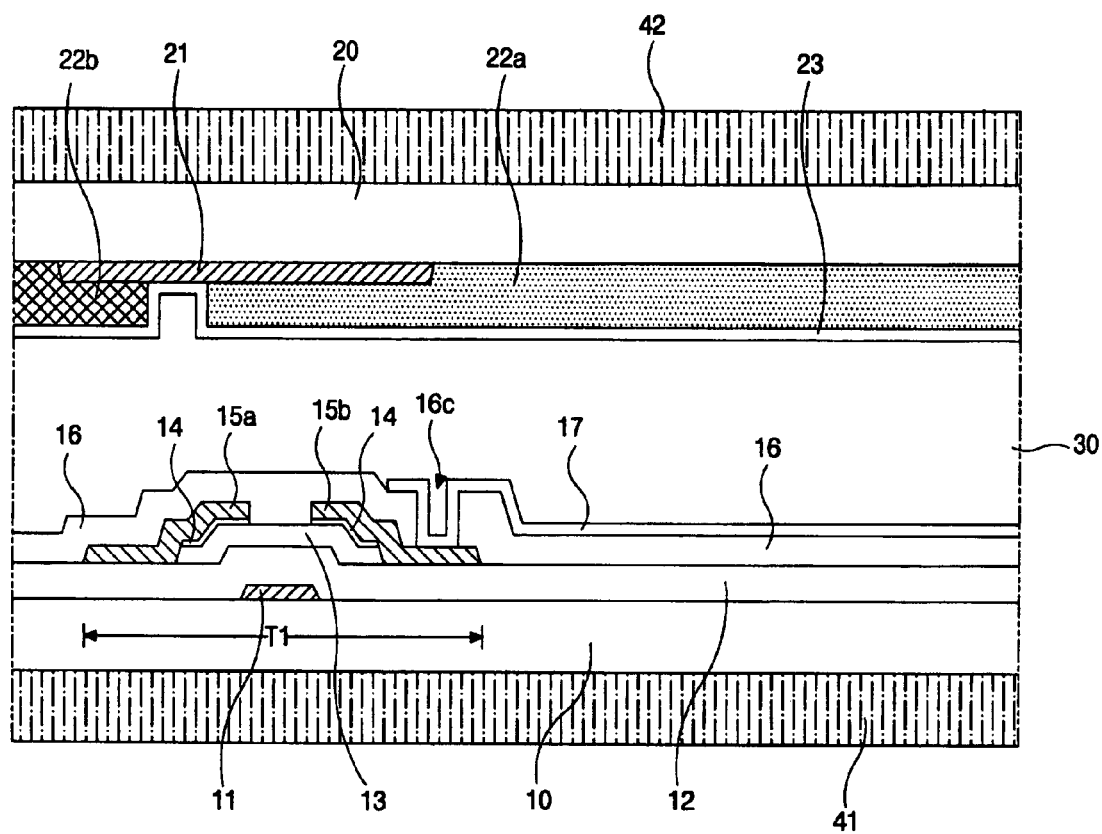
FIG. 1 illustrates a cross-sectional view of a typical liquid crystal display (LCD) device.
Figure 2:
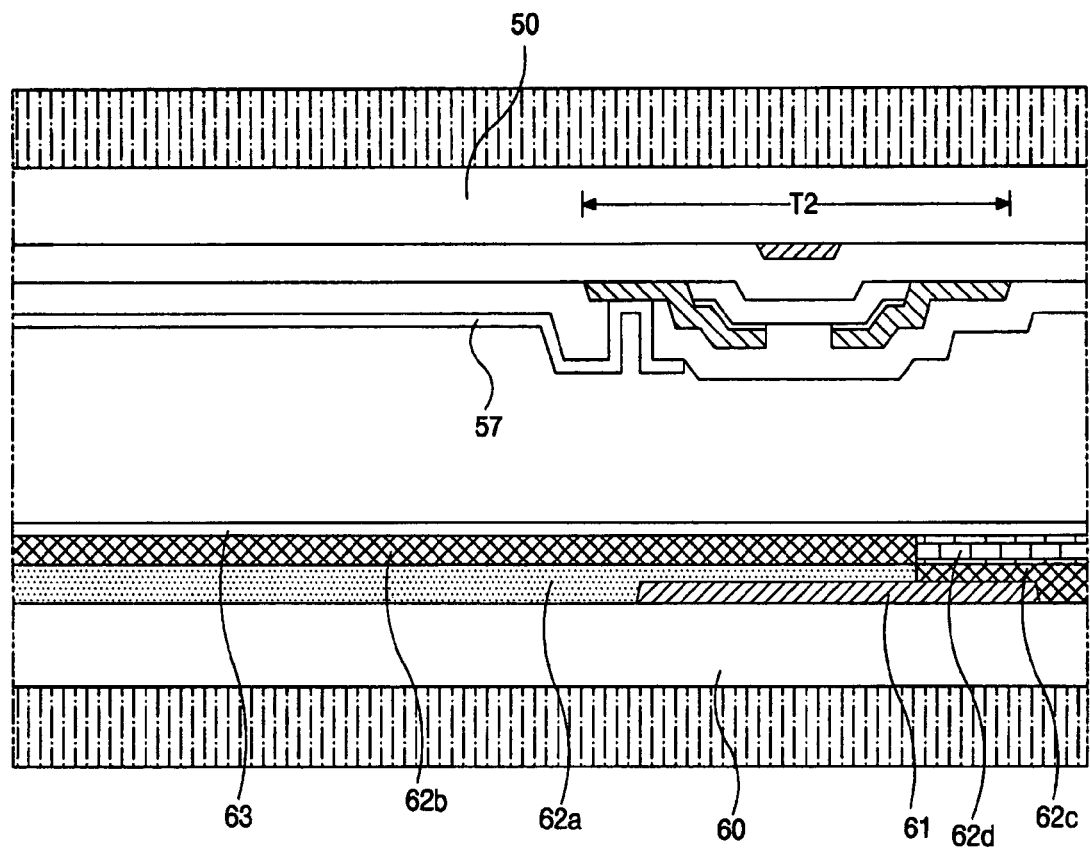
FIG. 2 illustrates a cross-sectional view of a transmissive liquid crystal display (LCD) device having a cholesteric liquid crystal (CLC) color filter according to the related art.
Figure 3:
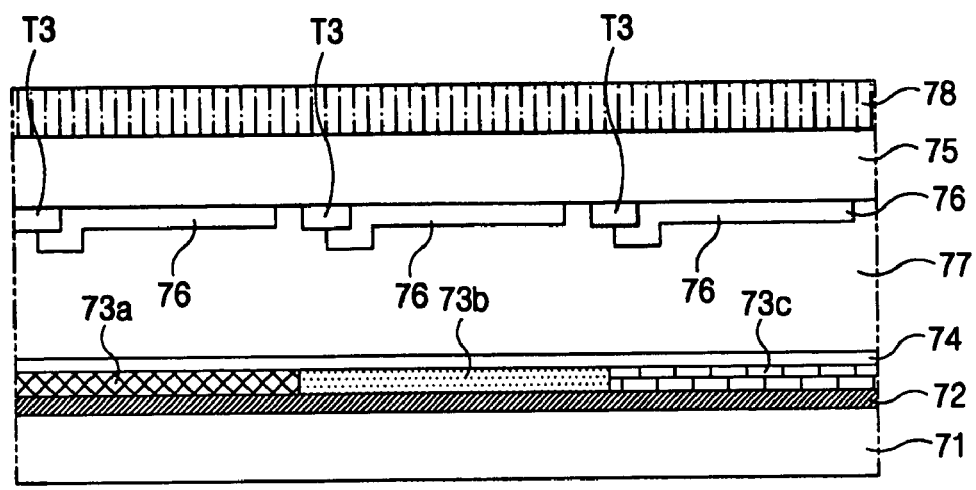
FIG. 3 illustrates a cross-sectional view of a reflective liquid crystal display (LCD) device having a cholesteric liquid crystal (CLC) color filter according to the related art.
Figure 4:
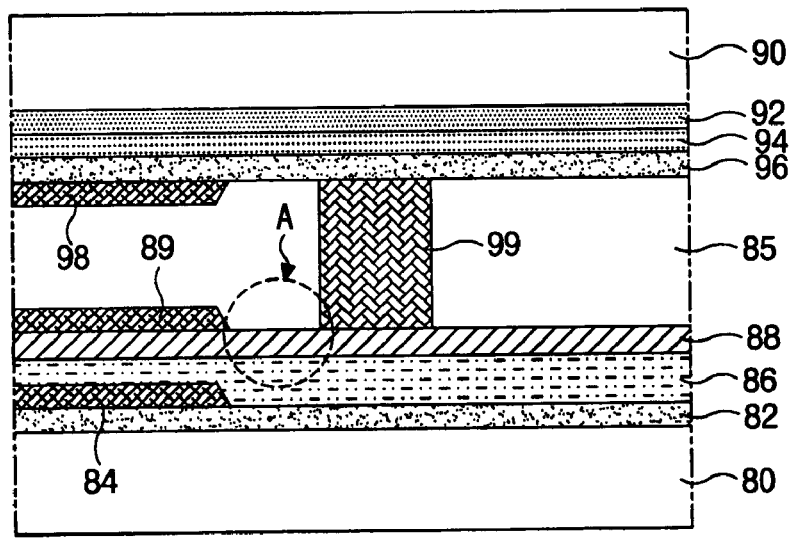
FIG. 4 illustrates a laminated structure near a seal pattern area of a reflective liquid crystal display (LCD) device having a cholesteric liquid crystal (CLC) color filter according to a first example of the related art.
Figure 5:
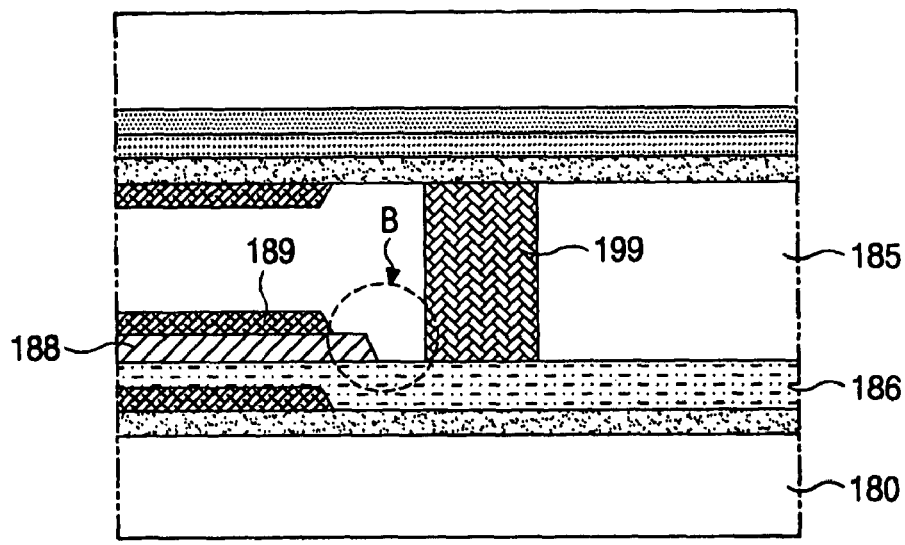
FIG. 5 illustrates a laminated structure near a seal pattern area of a reflective liquid crystal display (LCD) device having a cholesteric liquid crystal (CLC) color filter according to a second example of the related art.

Referring to FIG. 6A, a first insulating layer 292 formed of inorganic insulating material, a second insulating layer 294 formed of organic insulating material and a metal layer 296 formed of metal material such as chromium (Cr) are sequentially formed beneath an upper substrate 290. Though not shown in FIG. 6A, a second electrode formed of transparent conductive metal material is further formed beneath the upper substrate 290. An absorption layer 282, a first alignment layer 284, a cholesteric liquid crystal (CLC) color filter 286 and a first electrode 288 formed of transparent conductive material are sequentially formed on a lower substrate 200. Second and third alignment layers 289 and 298 are further formed respectively on the lower substrate 200 and beneath the upper substrate 290 to initially align liquid crystal molecules. The upper and lower substrates 290 and 200 are attached together by a seal pattern 299. The seal pattern 299 maintains a cell gap between the upper and lower substrates 290 and 200 and prevents the injected liquid crystal from leaking out. In this illustrated embodiment of the present invention, the first electrode 288 is overlapped with a portion of a seal pattern 299, as illustrated in a circle "C" of FIG. 6A. That is, the first electrode 288 that is formed of indium tin oxide (ITO) or other transparent conductive material is further formed in a portion of an area for the seal pattern 299, unlike the related art, and thus occupies a portion of the seal pattern area on which the seal pattern 299 will be formed in a later process. With this structure of the first electrode 288, the aforementioned problem that is caused by a contact between the CLC color filter 186 of FIG. 5 and the liquid crystal layer 185 of FIG. 5 can be overcome. That is, in the present embodiment of the invention, the first electrode 288 isolates the liquid crystal layer 250 from the CLC color filter color filter 286, and accordingly a swelling phenomenon of the liquid crystal and a contamination of the liquid crystal that may be caused by the contact of the liquid crystal layer 285 with the CLC color filter 286 can be prevented. A manufacturing method of a color filter substrate for the (LCD) device having the CLC color filter will be described in detail hereinafter with reference to Figures attached.

Figure 6B:
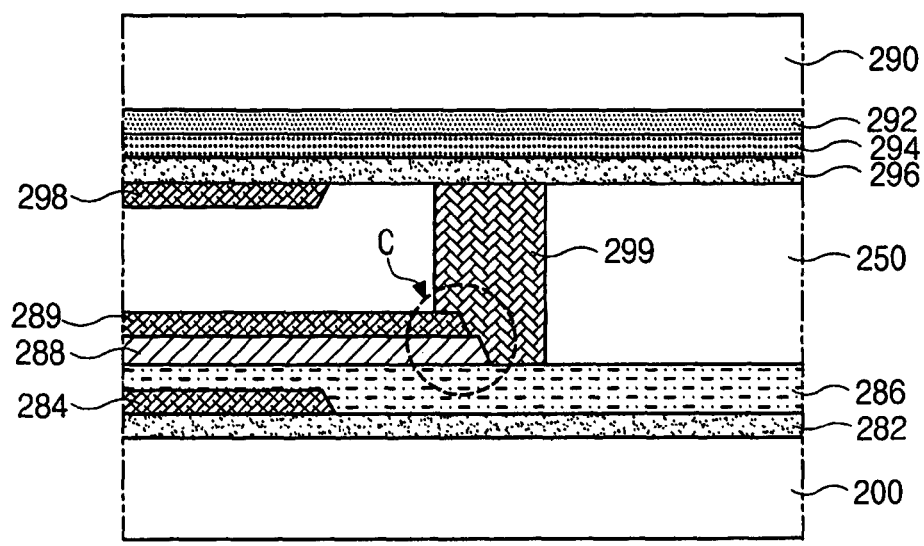
FIG. 6B illustrates a laminated structure near a seal pattern area of a liquid crystal display (LCD) device having a cholesteric liquid crystal (CLC) color filter according to another embodiment of the present invention.

Referring to FIG. 6B, a first insulating layer 292 formed of inorganic insulating material, a second insulating layer 294 formed of organic insulating material and a metal layer 296 formed of metal material such as chromium (Cr) are sequentially formed beneath an upper substrate 290. Though not shown in FIG. 6B, a second electrode formed of transparent conductive metal material is further formed beneath the upper substrate 290. An absorption layer 282, a first alignment layer 284, a cholesteric liquid crystal (CLC) color filter 286 and a first electrode 288 formed of transparent conductive material are sequentially formed on a lower substrate 200. Second and third alignment layers 289 and 298 are further formed respectively on the lower substrate 200 and beneath the upper substrate 290 to initially align liquid crystal molecules. The upper and lower substrates 290 and 200 are attached together by a seal pattern 299. The seal pattern 299 maintains a cell gap between the upper and lower substrates 290 and 200 and prevents the injected liquid crystal from leaking out. In this embodiment of the present invention, the first electrode 288 and the second alignment layer 289 are overlapped with a portion of a seal pattern 299, as illustrated in a circle "C" of FIG. 6B. That is, the first electrode 288 that is formed of indium tin oxide (ITO) or other transparent conductive material and the second alignment layer 289 are further formed in a portion of an area for the seal pattern 299, unlike the related art, and thus occupies a portion of the seal pattern area on which the seal pattern 299 will be formed in a later process. With this structure of the first electrode 288 and the second alignment layer 289, the aforementioned problem that is caused by a contact between the CLC color filter 186 of FIG. 5 and the liquid crystal layer 185 of FIG. 5 can be overcome. That is, in this embodiment of the present invention, the first electrode 288 and the second alignment layer 289 isolate the liquid crystal layer 250 from the CLC color filter color filter 286, and accordingly a swelling phenomenon of the liquid crystal and a contamination of the liquid crystal that may be caused by the contact of the liquid crystal layer 285 with the CLC color filter 286 can be prevented. A manufacturing method of a color filter substrate for the (LCD) device having the CLC color filter will be described in detail hereinafter with reference to Figures attached.

FIGS. 7A to 7E illustrate a fabricating sequence of a color filter substrate for a liquid crystal display (LCD) device having a cholesteric liquid crystal (CLC) color filter according to the present invention.

Figure 7A:
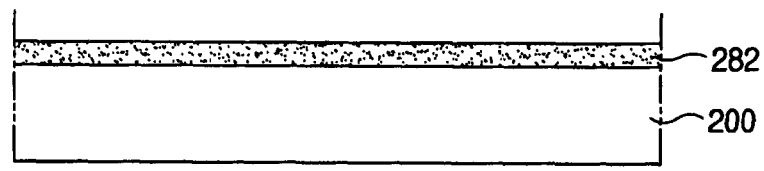
FIGS. 7A to 7E illustrate a fabricating sequence of a color filter substrate for a liquid crystal display (LCD) device having a cholesteric liquid crystal (CLC) color filter according to the present invention.
Figure 7B:
Figure 7C:
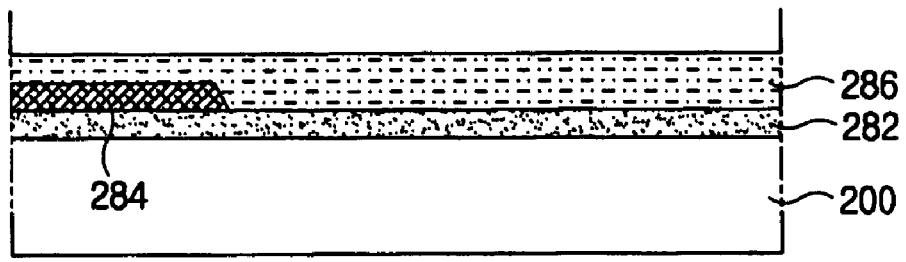
Figure 7D:
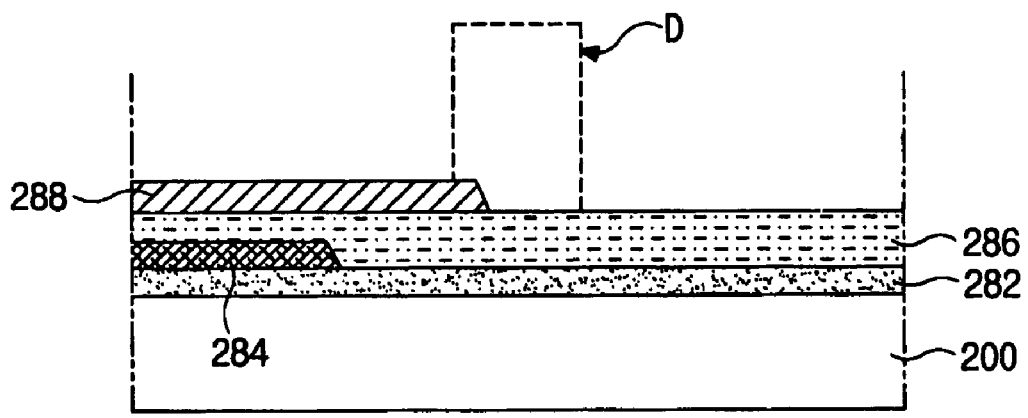
Figure 7E:
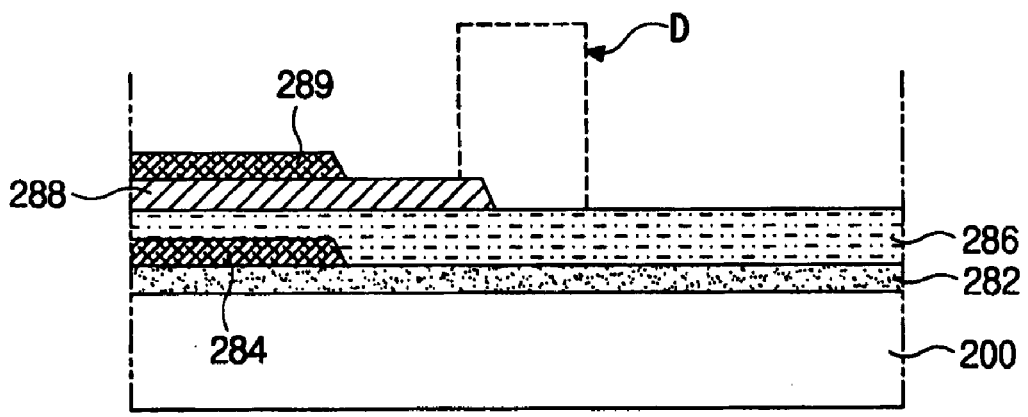

Referring to FIGS. 7A and 7B, an absorption layer 282 is formed on a transparent substrate 200, and then a first alignment layer 284 is formed on the absorption layer 282. Referring to FIG. 7C, a cholesteric liquid crystal (CLC) color filter 286 is formed on the first alignment layer 284. The CLC color filter 286 displays red, green and blue colors sequentially by selectively reflecting light in a wavelength range corresponding to each color. Referring to FIGS. 7D and 7E, a first electrode 288 is formed on the CLC color filter 286 and a second alignment layer 289 is formed on the first electrode 288. The first electrode 288 is formed of transparent conductive material such as indium tin oxide (ITO) and is overlapped with a portion of a seal pattern "D" that will be formed on one of an upper and lower substrates in a later process. Though the CLC color filter 286 has a single layered structure in the aforementioned embodiment, the CLC color filter 286 may have a double-layered structure. Though it is not described here, the same idea of the present invention can be applied to a transmissive liquid crystal display (LCD) device having the CLC color filter. If the present invention is applied to the transmissive LCD device, the absorption layer 282 on the substrate 200 need not be formed.

The method described with reference to FIGS. 7A to 7E can be modified as appropriate to manufacture the various embodiments of the present invention described herein, as well as other variations as can be appreciated by those of skill in the art.

Figure 8:
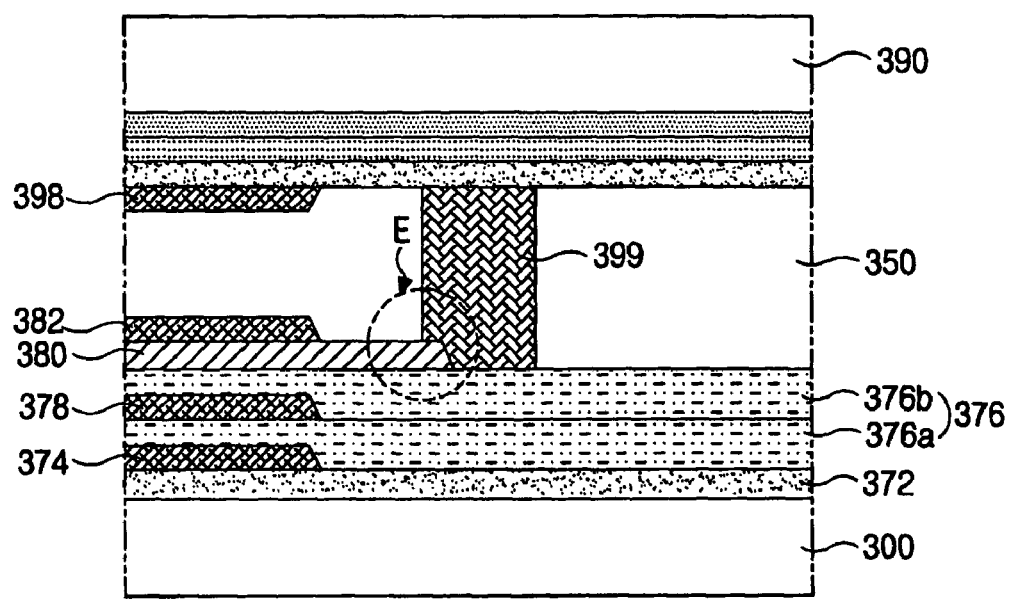
FIG. 8 illustrates a laminated structure near a seal pattern area of a reflective liquid crystal display (LCD) device having a cholesteric liquid crystal (CLC) color filter according to another embodiment of the present invention.

FIG. 8 illustrates a laminated structure near a seal pattern area of a reflective liquid crystal display (LCD) device having a CLC color filter according to a another embodiment of the present invention.

Referring to FIG. 8, a cholesteric liquid crystal (CLC) color filter 376 has a double-layered structure. More specifically, an absorption layer 372, a first alignment layer 374, a first CLC color filter layer 376a, a second alignment layer 378, a second CLC color filter layer 376b, a first transparent electrode 380 and a third alignment layer 382 are sequentially formed on a lower substrate 300. A fourth alignment layer 398 is formed beneath an upper substrate 390 and a second transparent electrode (not shown) is further formed beneath the upper substrate 390. In this illustrated embodiment of the present invention, the first transparent electrode 380 is overlapped with a portion of a seal pattern 399 and thus prevents a liquid crystal layer 350 from contacting the CLC color filter 376 as illustrated in "E" of FIG. 8. Accordingly, the swelling phenomenon of the liquid crystal and the contamination of the liquid crystal due to the contact between the CLC color filter 376 and the liquid crystal layer 350 can be prevented.

Figure 9:
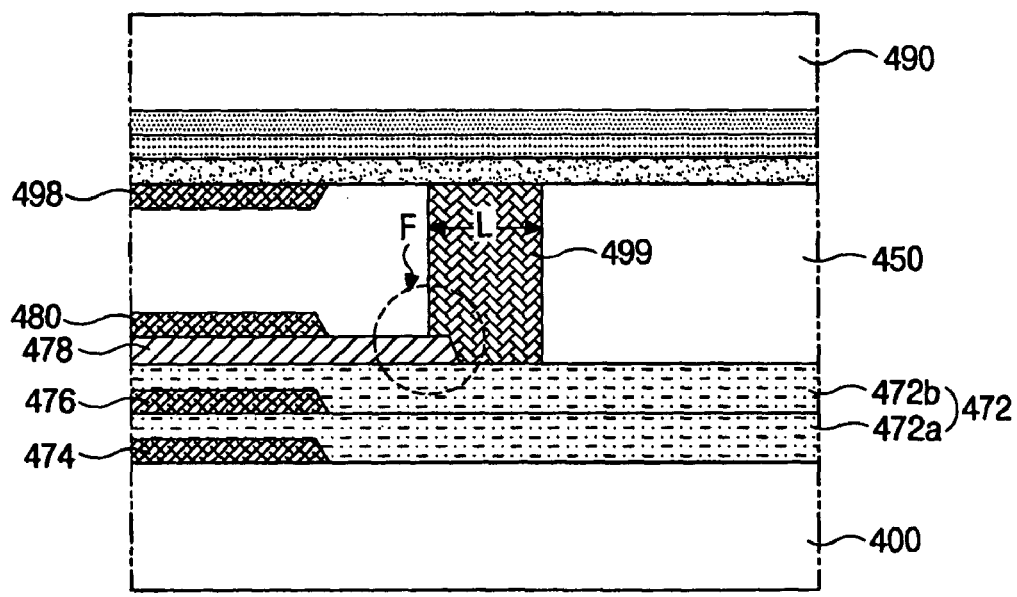
FIG. 9 illustrates a laminated structure near a seal pattern area of a transmissive liquid crystal display (LCD) device having a cholesteric liquid crystal (CLC) color filter according to another embodiment of the present invention.

FIG. 9 illustrates a laminated structure near a seal pattern area of a transmissive liquid crystal display (LCD) device having a CLC color filter according to another embodiment of the present invention.

Because a structure of an upper substrate 490 is same as those of the previously-described embodiments, an explanation on the upper substrate 490 will not be described again. Referring to FIG. 9, a first alignment layer 474, a first CLC color filter layer 472a, a second alignment layer 476, a second CLC color filter layer 472b, a first transparent electrode 478 and a third alignment layer 480 are sequentially formed on a lower substrate 400. Though not shown in FIG. 9, a second transparent electrode is further formed beneath the upper substrate 490 and a fourth alignment layer 498 is formed beneath the second transparent electrode. In this embodiment of the present invention, the first transparent electrode 478 is also overlapped with a portion of a seal pattern 499 as illustrated in "F" of FIG. 9. Accordingly, the swelling phenomenon and the contamination of the liquid crystal can be prevented.

In the aforementioned embodiment of the present invention, an overlapped width between the first transparent electrode and the seal pattern must be greater than zero and less than a width "L" in FIG. 9 of the seal pattern.

In the transmissive or reflective liquid crystal display (LCD) device having the CLC color filter, the transparent electrode of the lower substrate is overlapped with the portion of the seal pattern and the contact of the liquid crystal layer with the cholesteric liquid crystal (CLC) color filter layer can be intercepted. Therefore, the swelling phenomenon and the contamination of the liquid crystal that are caused by the contact between the liquid crystal and the cholesteric liquid crystal (CLC) color filter layer can be prevented. Accordingly, a residual image phenomenon can be reduced to a great degree and thus a quality of displayed images can be improved.

It will be apparent to those skilled in the art that various modifications and variation can be made in the fabrication and application of the present invention without departing from the spirit or scope of the invention. Thus, it is intended that the present invention cover the modifications and variations of this invention provided they come within the scope of the appended claims and their equivalents.

What is claimed is:

1. A liquid crystal display (LCD) device, comprising:
   a first substrate having a cholesteric liquid crystal (CLC) color filter;
   a second substrate having a thin film transistor;
   a seal pattern formed on one of the first and second substrates;
   a first electrode on the cholesteric liquid crystal (CLC) color filter, wherein the first electrode partially overlaps a portion of the seal pattern;
   a second electrode on the second substrate; and
   a liquid crystal layer between the first and second electrodes.

2. The device according to claim 1, wherein the liquid crystal display device is a reflective liquid crystal display (LCD) device.

3. A liquid crystal display (LCD) device, comprising:
   a first substrate having a cholesteric liquid crystal (CLC) color filter;
   a second substrate having a thin film transistor;
   a seal pattern formed on one of the first and second substrates;
   a first electrode on the cholesteric liquid crystal (CLC) color filter, the first electrode being overlapped with a portion of the seal pattern;
   a second electrode on the second substrate; and
   a liquid crystal layer between the first and second electrodes, wherein the liquid crystal display device is a transmissive liquid crystal display (LCD) device.

4. The device according to claim 1, wherein the cholesteric liquid crystal (CLC) color filter has a single-layered structure.

5. A liquid crystal display (LCD) device, comprising:
   a first substrate having a cholesteric liquid crystal (CLC) color filter, wherein the cholesteric liquid crystal (CLC) color filter has a double-layered structure;
   a second substrate having a thin film transistor;
   a seal pattern formed on one of the first and second substrates;
   a first electrode on the cholesteric liquid crystal (CLC) color filter, the first electrode being overlapped with a portion of the seal pattern;
   a second electrode on the second substrate; and
   a liquid crystal layer between the first and second electrodes.

6. A liquid crystal display (LCD) device, comprising:
   a first substrate having a cholesteric liquid crystal (CLC) color filter;
   a second substrate having a thin film transistor;
   a seal pattern formed on one of the first and second substrates;
   a first electrode on the cholesteric liquid crystal (CLC) color filter, the first electrode being overlapped with a portion of the seal pattern;
   a second electrode on the second substrate; and
   a liquid crystal layer between the first and second electrodes, wherein an overlapped width between the first electrode and the seal pattern is greater than zero and less than a width of the seal pattern.

7. The device according to claim 1, wherein the first electrode includes transparent conductive material.

8. The device according to claim 7, wherein the transparent conductive material is an indium tin oxide (ITO).

9. The device according to claim 1, further comprising an alignment layer on the first electrode, wherein the seal pattern partially overlaps the alignment layer.

10. A method of manufacturing a color filter substrate for a liquid crystal display (LCD) device, comprising:
    forming a first alignment layer on a substrate, the substrate having a seal pattern forming area defined thereon where a seal pattern is to be formed;
    forming a cholesteric liquid crystal (CLC) color filter on the first alignment layer;
    forming an electrode on the cholesteric liquid crystal (CLC) color filter, wherein the electrode partially overlaps a portion of the seal pattern forming area; and
    forming a second alignment layer on the first electrode.

11. The method according to claim 10, further comprising forming an absorption layer between the substrate and the first alignment layer.

12. The method according to claim 10, wherein the liquid crystal display device is a reflective liquid crystal display (LCD) device.

13. A method of manufacturing a color filter substrate for a transmissive liquid crystal display (LCD) device, comprising:

forming a first alignment layer on a substrate, the substrate having a seal pattern forming area defined thereon where a seal pattern is to be formed;

forming a cholesteric liquid crystal (CLC) color filter on the first alignment layer;

forming an electrode on the cholesteric liquid crystal (CLC) color filter, the electrode being overlapped with a portion of the seal pattern forming area; and forming a second alignment layer on the first electrode.

14. The method according to claim 10, wherein the cholesteric liquid crystal (CLC) color filter has a single-layered structure.

15. A method of manufacturing a color filter substrate for a liquid crystal display (LCD) device, comprising:

forming a first alignment layer on a substrate, the substrate having a seal pattern forming area defined thereon where a seal pattern is to be formed;

forming a cholesteric liquid crystal (CLC) color filter on the first alignment layer, wherein the cholesteric liquid crystal (CLC) color filter has a double-layered structure;

forming an electrode on the cholesteric liquid crystal (CLC) color filter, the electrode being overlapped with a portion of the seal pattern forming area; and forming a second alignment layer on the first electrode.

16. A method of manufacturing a color filter substrate for a liquid crystal display (LCD) device, comprising:

forming a first alignment layer on a substrate, the substrate having a seal pattern forming area defined thereon where a seal pattern is to be formed;

forming a cholesteric liquid crystal (CLC) color filter on the first alignment layer;

forming an electrode on the cholesteric liquid crystal (CLC) color filter, the electrode being overlapped with a portion of the seal pattern forming area; and forming a second alignment layer on the first electrode, wherein an overlapped width between the electrode and the seal pattern forming area is greater than zero and less than a width of the seal pattern.

17. The method according to claim 10, wherein the electrode is formed of transparent conductive material.

18. The method according to claim 17, wherein the transparent conductive material includes an indium tin oxide (ITO).

19. The method according to claim 10, wherein the seal pattern forming area partially overlaps the second alignment layer.

20. A method of manufacturing a liquid crystal display (LCD) device, comprising:

forming a first alignment layer on a first substrate;

forming a cholesteric liquid crystal (CLC) color filter on the first alignment layer;

forming a first electrode on the cholesteric liquid crystal (CLC) color filter;

forming a second alignment layer on the first electrode;

forming a seal pattern partially overlapping a portion of the first electrode;

forming a second electrode on a second substrate;

forming a third alignment layer on the second electrode;

attaching the second substrate to the first substrate using the seal pattern; and providing a liquid crystal layer between the first and second substrates.

21. The method of claim 20, wherein the seal pattern partially overlaps the second alignment layer.

* * * * *